(12) United States Patent
Slotte et al.

(10) Patent No.: US 6,947,420 B1
(45) Date of Patent: Sep. 20, 2005

(54) APPLICATIONS OF USER-TO-USER INFORMATION TRANSFER BETWEEN TELECOMMUNICATION DEVICES

(75) Inventors: Sverre Slotte, Esbo (FI); Arto Karppanen, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/412,897

(22) Filed: Oct. 5, 1999

(30) Foreign Application Priority Data

Oct. 6, 1998 (FI) ........................................ 982160

(51) Int. Cl.[7] .......................................... H04L 12/56
(52) U.S. Cl. ...................................... 370/392; 370/389
(58) Field of Search ............................... 370/277, 278, 370/282, 294, 321, 328, 329, 337, 349, 467, 370/471, 472, 470, 474, 389, 432, 392, 465

(56) References Cited

U.S. PATENT DOCUMENTS

| | | | |
|---|---|---|---|
| 5,008,930 A | 4/1991 | Gawrys et al. | 379/210 |
| 5,046,189 A | 9/1991 | Kainuma | 379/100 |
| 5,442,691 A | 8/1995 | Price et al. | 379/220 |
| 5,572,675 A | 11/1996 | Bergler | 395/200.2 |
| 5,809,127 A | 9/1998 | Ostrcil | 379/201 |
| 6,249,584 B1 * | 6/2001 | Hamalainen et al. | 380/270 |
| 6,359,871 B1 * | 3/2002 | Chung et al. | 370/338 |
| 6,408,063 B1 * | 6/2002 | Slotte et al. | 379/230 |

FOREIGN PATENT DOCUMENTS

| | | |
|---|---|---|
| EP | 0515276 A3 | 11/1992 |
| EP | 0555014 A3 | 8/1993 |
| EP | 0762790 A2 | 3/1997 |
| EP | 0779760 A1 | 6/1997 |
| EP | 0796020 A2 | 9/1997 |
| EP | 0859533 A1 | 8/1998 |
| EP | 0924917 A2 | 6/1999 |
| EP | 0942622 A2 | 9/1999 |
| GB | 2298761 | 9/1996 |
| WO | WO 99/25107 | 5/1999 |

OTHER PUBLICATIONS

GSM Technical Specification 02.87, Nov. 1997, Version 5.2.1, Digital Cellular Telecommunications System (Phase 2+); User-to-User Signalling (UUS); Service description, Stage 1.

"Digital Cellular Telecommunications System (Phase 2+); User-to-User Signalling (UUS); Service Description, Stage 1", GSM Technical Specification, GSM 02.87, Version 5.2.1., 1997.

* cited by examiner

Primary Examiner—Duc Ho
Assistant Examiner—Thien D Tran
(74) Attorney, Agent, or Firm—Perman & Green, LLP.

(57) ABSTRACT

A telephone connection is complemented with additional information by, after initiating the telephone connection between a transmitting telecommunication device and a receiving telecommunication device, composing, at the transmitting telecommunication device, a signalling message of predetermined form to be transmitted in association with the telecommunication connection. The signalling message contains the additional information. Within the signalling message there is indicated the intended receiving part within the receiving telecommunication device of at least part of the signalling message. The signalling message is transmitted from the transmitting telecommunciation device to the receiving telecomunication device.

6 Claims, 2 Drawing Sheets

APPLICATIONS OF USER-TO-USER INFORMATION TRANSFER BETWEEN TELECOMMUNICATION DEVICES

TECHNOLOGICAL FIELD

The invention relates to the communication of information between telecommunication devices transparently through a network. Especially the invention concerns the applications of User-to-User Signalling (UUS).

BACKGROUND OF THE INVENTION

The term signalling generally refers to transmitting, from one telecommunication device to another, some information that relates more to the management of the communication connection than directly to the payload, like speech or data, for the transmission of which the communication connection between the devices has been established. For example in mobile telephony signalling is used to exchange measurement results, announcements, commands and short messages between a mobile terminal and a base station, or between the different devices belonging to the fixed parts of the mobile telephone network.

User-to-User Signalling or UUS is a procedure recently disclosed as a supplementary service in some advanced telephone systems. Its inteded use is the transmission of a limited amount of subscriber generated information (UUI; User-to-User Information) to and/or from another user in association with a call between the users concerned. The nature of UUS dictates that the network that mediates the communication between the users does not interpret the UUI or act upon it in any way, i.e. it is passed "transparently" through the network. This patent application will refer to the known aspects of UUS in the form in which they have been disclosed in the document "GSM 02.87: GSM Digital Cellular Telecommunications System (Phase 2+); User-to-User Signalling (UUS); Service Description, Stage 1, v.5.2.1", which has been published by ETSI (European Telecommunications Standards Institute) in November 1997 and which is incorporated herein by reference. However, the invention is applicable in association with all current and future telecommunication systems which support user-to-user signalling in a form comparable to that described below.

There are, at the time of filing this patent application, three subclasses of UUS, namely Service 1, Service 2 and Service 3. A user has access to these services as described in his/her subscription contract with the system operator. According to Service 1, UUI can be sent and received during call setup and termination by embedding UUI into the appropriate call control messages. Service 1 can be an implicit part of each call setup, whereby the user does not have to initiate the transmission of a UUS message separately, or it may be explicit in which case the user has to initiate an appropriate procedure. Service 2 encompasses the UUS messages that are sent and received after the calling party has received an indication that the called party has been informed of the call, but before the call is actually established. The network is not responsible for delivering a sent Service 2 message to its recipient before the call will be established. All such UUS messages that are sent and received during an established call connection belong to Service 3.

For example an ISDN system (Integrated Services Digital Network) allows as a network option the transfer of UUI with a maximum length of 32 octets for Service 1. The endpoints of a point-to-point connection where UUS is used may be mobile-to-mobile, mobile-to-PLMN (Public Land Mobile Network), mobile-to-ISDN network, mobile-to-ISDN terminal, or mobile-to-PSTN (Public Switched Telephone Network). If the other end is PLMN, ISDN network or ISDN terminal, it must be equipped with sufficient ISUP (ISDN Signalling User Part) signalling support known as such to the person skilled in the art. If the other end is PSTN, it must be equipped with sufficient inter-exchange ISUP signaling support known as such to the person skilled in the art.

The prior art publications disclose only a very limited number of actual applications for UUS. It is therefore an object of the invention to present a method and the necessary equipment for providing added value to a telephone connection by using specific applications of UUS.

SUMMARY OF THE INVENTION

The objects of the invention are achieved by presenting a certain inner structure for an UUS message, and associating certain information elements within UUS messages with the suggested use of the contents of a received UUS message.

It is characteristic to the method according to the invention that it comprises the steps of initiating a telephone connection between a transmitting telecommunication device and a receiving telecommunication device, composing, at said transmitting telecommunication device, a signalling message of predetermined form to be transmitted in association with the telephone connection, said signalling message containing additional information which is to complement the telephone connection, indicating, within said signalling message, the intended receiving part within said receiving telecommunication device of at least part of said signalling message and transmitting said signalling message from said transmitting telecommunication device to said receiving telecommunication device.

The invention also applies to a telecommunication device for the transmission of signalling and payload information. It comprises a transceiver unit, a unit for processing received payload information, a unit for processing payload information to be transmitted, and a control block. The transceiver unit is arranged to direct received signalling information to the control block and to take signalling information to be transmitted from the control block. It is characteristic to the invention that it comprises a signalling unit arranged to compose a signalling message of predetermined form to be transmitted in association with a payload information transmission connection, and to indicate, within said signalling message, the intended receiving part within another telecommunication device of at least part of said signalling message.

The limited applicability of known UUS arises from the concept of using UUS only to transmit human-readable character strings from the transmitting user to the receiving user. For example in the known ISDN applications it is assumed that the receiving user has a terminal that contains a display so that it may reveal the contents of a received UUS message to the user in the form of a character string. However, even the present terminals include a large number of other functional blocks than the display, and it is expected that in the near future a large number of completely new terminal types will emerge, combining at least some of the features of a video telephone, portable telefax, palmtop computer, positioning device and many other portable electronic devices previously known as separate units. Additionally the receiving device of an UUS message may be some other device in the network than a terminal.

According to the invention an inner structure is given to a UUS message, whereby specific parts of the message may be used to identify the intended target of the message within the receiving device and/or the intended use of the contents of the message. The message may contain a human-readable character string, a number of undisplayable and/or unreadable characters, a passage of binary code only intelligible to computers operating under a certain program or protocol, a digitised waveform or some other information of unlimited nature. The intended target of the message may be a display, a processor, a register or memory location, an application program, a loudspeaker or some other specified functional block, or the message may leave it to the discretion of the receiving device to direct the contents of the message to a suitable block.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
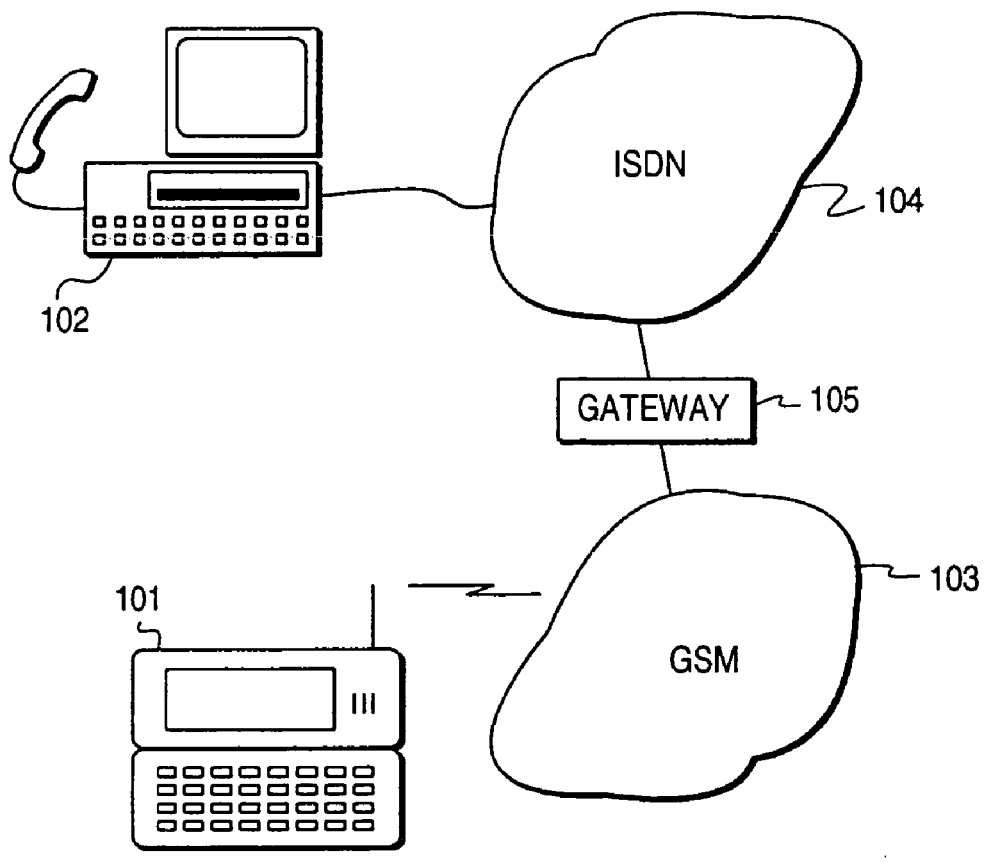
FIG. 1 illustrates the concept of transmitting an UUS message.

To facilitate full understanding of the invention we will first briefly refer to FIG. 1, where the terminal 101 of a first user is transmitting a UUS message to the terminal 102 of a second user. For the sake of example we may assume that terminal 101 is a mobile terminal resembling the known Nokia 9000 Communicator in a digital cellular radio system 103, and terminal 102 is a multifunctional office ISDN terminal comprising the known features of a desktop computer, telefax and telephone. In FIG. 1 it has been assumed that the cellular radio system 103 is GSM network (Global System for Mobile telecommunications) and that there is a gateway connection 105 between it and the ISDN network 104. We may further assume that the user of terminal 101 has placed a telephone call to the user of terminal 102, so that the UUS message will be sent in association with said telephone call. For the purpose of this description it is not important, which of the Services 1, 2 or 3 of UUS is used.

According to known UUS, the user of terminal 101 should use a keyboard or corresponding input means for composing a character string which the terminal 101 would formulate into a UUS message. This conventional UUS message would consist of a Protocol Discriminator field and a data field comprising the composed character string. According to the known GSM specification number GSM 04.08 the Protocol Discriminator field would indicate the applicable protocol as "IA5 chars". The resulting message would then traverse the cellular radio system 103, go through the gateway 105 and follow the routing of the telephone call to the ISDN extension to which the terminal 102 is connected. After having received the UUS message terminal 102 would display the character string contained therein on a display.

According to the invention, terminal 101 may insert into a UUS message any kind of information that is possible to represent by bits. A character string typically consists of octets, where each octet is an eight-bit representation of a certain human-readable character. Standardised coding schemes like ASCII (American Standard Code for Information Interchange) are used to encode a character string into octets. The UUS message according to the invention may comprise characters encoded according to some other coding scheme that may be publicly known or even some secret scheme known only to the terminals 101 and 102. Most coding schemes that are used to handle machine-readable digital codes do not use the concept of a character, but consist e.g. of instructions, operators and values to be handled according to the instructions. Consequently the UUS message according to the invention may comprise a number of undisplayable and/or unreadable characters, a passage of binary code, a digitised waveform or some other information that has a representation in binary form.

Figure 2:
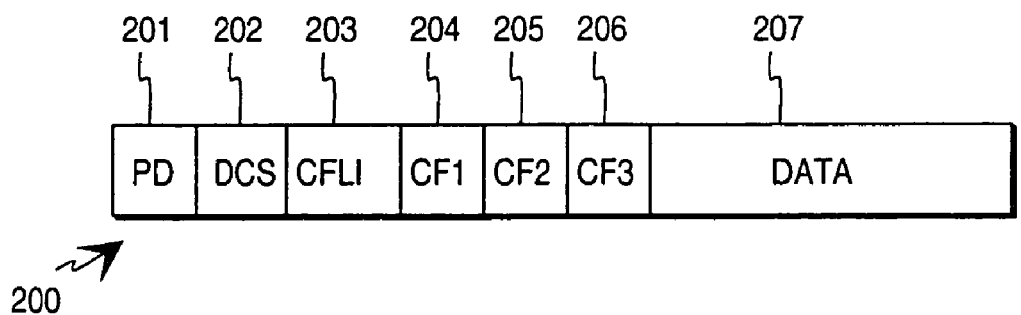
FIG. 2 illustrates an advantageous inner structure of an UUS message according to the invention.

The receiving terminal 102 may not be aware of what kind of information the transmitting terminal 101 wishes to transmit in a UUS message. One solution for providing the necessary information to the receiving terminal would be to set up a logical UUS link between the terminals, in the beginning of which a negotiation procedure would be used to fix the conditions for the following UUS message exchange. FIG. 2 proposes an alternative solution, which does not require such a negotiation procedure. The examplary UUS message 200 of FIG. 2 consists of a number of fields, of which a Protocol Discriminator (PD) field 201, a Data Coding Scheme (DCS) field 202, an Control Field Length Indicator (CFLI) field 203, three Control Fields (CF) 204, 205 and 206 as well as a data field 207 are shown. Of these, the PD and DCS fields together indicate, what kind of protocol and what kind of coding scheme have been used in the preparation of the message, and the CFLI field indicates the combined length of the header fields (all fields except the data field). The data field 207 is, as its name indicates, the field that contains the actual data for the transmission of which the UUS message has been composed.

The CF fields (which may also be called Information Element fields; IE), may be used to transmit several kinds of information like sequence numbering of several consecutive messages. However, a very specific use of the CF fields is closely associated with the broadening of the UUS application possibilities suggested by the present invention. Depending on the contents of the data field, the part of the receiving terminal that is supposed to handle or take advantage of the UUS message may vary. The CF fields are most advantageously used to transmit the identification of the functional block in the receiving device to which the UUS message is destined or the specific intended action that the receiving device is supposed to do and to which the contents of the UUS message are related.

If we apply the invention to the purpose of transmitting a displayable text message, which is the previously known application of UUS messages, the contents of the fields of FIG. 2 might be as follows.

PD field 201: a code identifying the conventional UUS text message transmission as the applicable protocol.

DCS field 202: a code identifying ASCII as the coding scheme.

CFLI field 203: a binary number indicating the combined length of the PD, DCS, CFLI and CF1 fields in octets.

CF1 204: a code identifying the display as the intended receiving functional block within the receiving device.

DATA 207: the text message as an ASCII character string.

It is easy to generalize the above-presented way of utilizing the fields for identifying an arbitrary protocol, coding scheme and intended receiving functional blocks or processes. The invention does not limit the selection of codes that are used to identify them. However, to avoid confusion, it is recommendable that a standard selection of codes will be established within or in association with an internationally recognised telecommunications standard.

It should be understood that the invention does not require the above-mentioned fields to appear in each and every UUS message. For example backward compatibility with previously known UUS schemes is easily provided by defining that if the contents of the PD field indicate "IA5 chars" as in a prior art UUS message, no other header or control fields are present in the message and it will be handled like a conventional UUS message (the contents of the data field immediately following the PD field are understood as a string of displayable characters). If the PD field indicates some other protocol, such receiving devices that do not support the indicated protocol simply handle the UUS message as a badly received (corrupted) UUS message, which typically means that they discard the message and do not take any further action.

Figure 3:
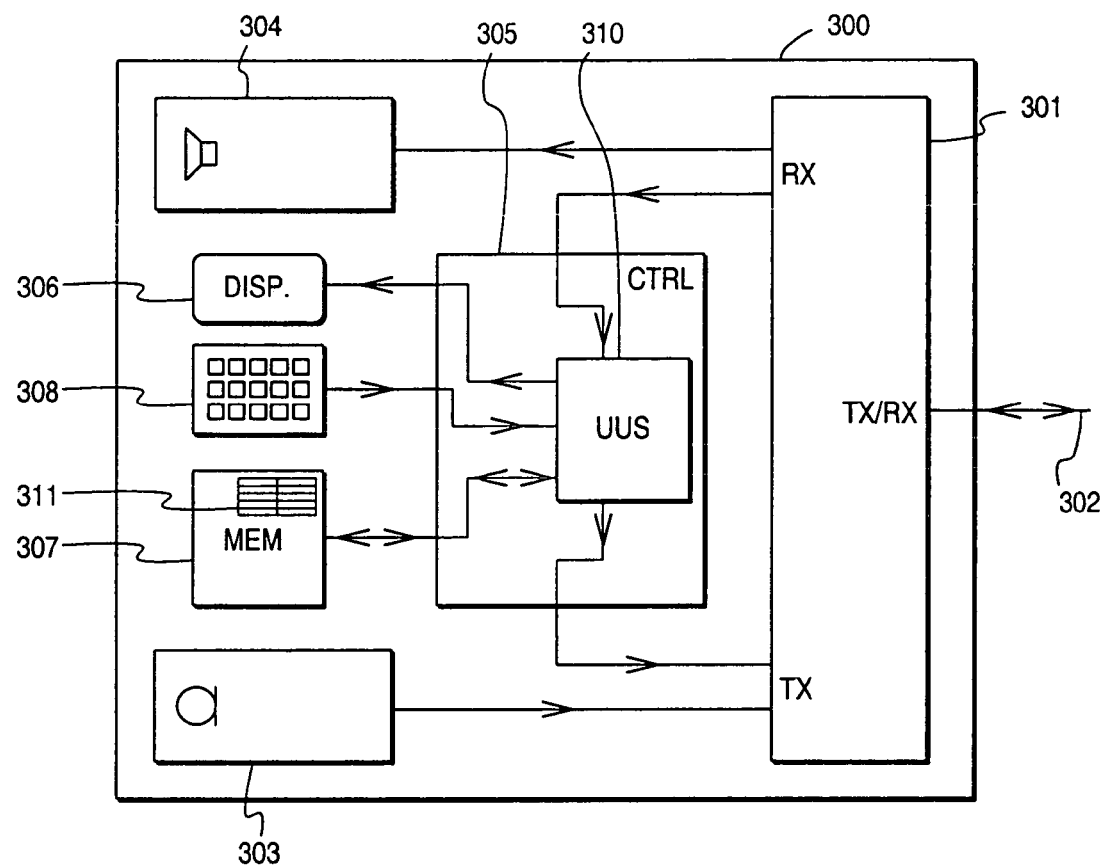
FIG. 3 illustrates an advantageous terminal structure according to the invention.

FIG. 3 illustrates a simplified terminal structure 300 that is advantageously used for transmitting and/or receiving structured UUS messages according to the invention. The terminal is a telephone device and comprises a transceiver 301 for transmitting and receiving information over a physical link 302, which may as such be a radio link, a wireline connection, an infrared link or some other known physical link; the transceiver comprises the necessary means known as such for arranging for the information input at the TX lines to be transmitted over the physical link and information received over the physical link to be output at the RX lines. Connected to the TX and/or RX lines there are a speech recording unit 303, a speech reproduction unit 304 and a control block 305. The latter is additionally coupled to a display 306, a memory 307 and a keyboard 308. The receiver side of the transceiver 301 is arranged to separate received signalling (UUS along with all other signalling) from received speech frames and to direct signalling to the control block 305 and speech frames to the speech reproduction unit 304. Similarly the transmitter side of the transceiver 301 is arranged to take speech frames to be transmitted from the speech recording unit 303 and signalling to be transmitted from the control block 305.

Within the control block 305 there is a UUS unit 310 for transmitting and receiving UUS messages. The receiving side of the UUS unit is capable of identifying, from a received UUS message, the protocol and coding scheme that have been used for creating the message. Additionally the receiving side of the UUS unit is capable of identifying, from the contents of the CF fields in a received UUS message, the functional block or process that is the intended recipient of the data part of the message. On the basis of the latter identification the UUS unit directs the data part of a received UUS message in a suitably decoded form to the correct functional block or process. The transmitting side of the UUS unit is capable of taking a piece of information from the keyboard, from the other parts of the control block or from some other part of the terminal and formatting it into a UUS message to be transmitted. In the process of formatting the UUS message, the transmitting side of the UUS unit uses its knowledge about the appropriate codes for identifying a protocol, a coding scheme and an intended receiving functional block or process in the device to which the UUS message is to be transmitted. The codes for identifying a protocol, a coding scheme and an intended receiving functional block or process are most advantageously stored in the memory 307 as a look-up table 311.

The functions represented as the UUS unit in FIG. 3 are most advantageously implemented by programming them as an executable program for a microprocessor, which as such is within the capabilities of a person skilled in the art.

The invention has been described above solely with reference to the UUS specifications as they appear in the appropriate standards mentioned in the description of prior art. However, the invention is equally well applicable to other systems where short messages are used in association with telephone or dataphone connections to transmit call-related information between two endpoints without the network between them reacting on the messages in any other way than by providing the means for their transmission.

What is claimed is:

1. A method for complementing a telephone connection with additional information, comprising the steps of
    initiating the telephone connection between a transmitting telecommunication device and a receiving telecommunication device,
    composing, at said transmitting telecommunication device, a signalling message of predetermined form to be transmitted in association with the telephone connection, said signalling message containing the additional information,
    indicating, within said signalling message, an intended receiving part within said receiving telecommunication device of at least part of said signalling message and
    transmitting said signalling message from said transmitting telecommunication device to said receiving telecommunication device.

2. A method according to claim 1, additionally comprising the step of indicating, within said signalling message, a certain protocol used in the creation of said signalling message.

3. A method according to claim 1, additionally comprising the step of indicating, within said signalling message, a certain coding scheme used in the creation of said signalling message.

4. A method according to claim 1, additionally comprising the steps of
    composing said signalling message from a number of header fields and a data field and
    indicating, within said signalling message, the combined length of said header fields.

5. A telecommunication device for the transmission of signalling and payload information, comprising
    a transceiver unit,
    a unit for processing received payload information,
    a unit for processing payload information to be transmitted,
    a control block, and
    a signalling unit;
    of which said transceiver unit is arranged to direct received signalling information to the control block and to take signalling information to be transmitted from the control block, and said signalling unit is arranged to compose a signalling message of predetermined form to be transmitted in association with a payload information transmission connection, and to indicate, within said signalling message, an intended receiving part within another telecommunication device of at least part of said signalling message.

6. A telecommunication device according to claim 5, wherein said signalling unit is additionally arranged to receive a signalling message from another telecommunication device in association with a payload information transmission connection, and to direct at least part of the received signalling message to a certain functional block within the telecommunication device according to an indication contained in the received signalling message.

* * * * *